US012340961B2

(12) United States Patent
Hofsaess

(10) Patent No.: US 12,340,961 B2
(45) Date of Patent: Jun. 24, 2025

(54) TEMPERATURE-DEPENDENT SWITCHING MECHANISM, TEMPERATURE-DEPENDENT SWITCH, AND METHOD OF MANUFACTURING THE SAME

(71) Applicant: Marcel P. Hofsaess, Steintahleben (DE)

(72) Inventor: Marcel P. Hofsaess, Steintahleben (DE)

( * ) Notice: Subject to any disclaimer, the term of this patent is extended or adjusted under 35 U.S.C. 154(b) by 143 days.

(21) Appl. No.: 18/356,635

(22) Filed: Jul. 21, 2023

(65) Prior Publication Data

US 2024/0029974 A1 Jan. 25, 2024

(30) Foreign Application Priority Data

Jul. 22, 2022 (DE) ......................... 102022118402.1

(51) Int. Cl.

*H01H 37/52* (2006.01)
*H01H 11/00* (2006.01)
*H01H 37/04* (2006.01)

(52) U.S. Cl.

CPC ............ *H01H 37/52* (2013.01); *H01H 11/00* (2013.01); *H01H 37/04* (2013.01); *H01H 2037/525* (2013.01)

(58) Field of Classification Search

CPC ........ H01H 37/52; H01H 11/00; H01H 37/04; H01H 2037/525; H01H 2037/5481; H01H 37/5427; H01H 37/5409

See application file for complete search history.

(56) References Cited

U.S. PATENT DOCUMENTS 4,306,211 A 12/1981 Hofsäss
4,470,033 A * 9/1984 Hofsass ............ H01H 37/5427
337/365

(Continued)

FOREIGN PATENT DOCUMENTS

DE 2917482 A1 11/1980
DE 19919648 A1 12/2000

(Continued)

OTHER PUBLICATIONS

Examination Report Issued in DE 102022118402.1 dated Jan. 24, 2023, in 5 pages.

(Continued)

*Primary Examiner* — Stephen S Sul
(74) *Attorney, Agent, or Firm* — Knobbe, Martens, Olson & Bear, LLP

(57) ABSTRACT

A temperature-dependent switching mechanism for a temperature-dependent switch, having: a temperature-dependent bimetal snap-action disc having a first through hole; a temperature independent snap-action spring disc having a second through hole; and an electrically conductive contact member including a main body that passes through the first through hole and the second through hole. The contact member includes a support shoulder projecting radially from the main body, a first locking element projecting radially from the main body and arranged on a first side of the support shoulder, and a second locking element projecting radially from the main body and arranged on a second side of the support shoulder opposite the first side. The temperature-dependent bimetal snap-action disc and the snap-action spring disc are arranged between the locking elements and the support shoulder and are each held captive, but with clearance, by these on the main body of the contact member.

14 Claims, 5 Drawing Sheets

(56) References Cited

U.S. PATENT DOCUMENTS

| | | | | |
|---|---|---|---|---|
| 6,724,293 | B1 * | 4/2004 | Hofsass ................. | H01H 37/04 337/380 |
| 10,256,061 | B2 | 4/2019 | Neumann | |
| 10,439,196 | B2 | 10/2019 | Bourns et al. | |
| 10,985,552 | B2 | 4/2021 | Tada et al. | |
| 11,004,634 | B2 | 5/2021 | Namikawa | |
| 11,239,037 | B2 | 2/2022 | Namikawa | |
| 11,329,325 | B2 | 5/2022 | Namikawa | |
| 11,373,826 | B2 | 6/2022 | Namikawa | |
| 11,476,066 | B2 | 10/2022 | Hofsäss | |
| 11,551,895 | B2 | 1/2023 | Namikawa | |
| 11,615,930 | B2 | 3/2023 | Namikawa | |
| 11,636,991 | B2 | 4/2023 | Miyata | |
| 11,651,922 | B2 | 5/2023 | Tada et al. | |
| 2013/0127585 | A1 * | 5/2013 | Hofsaess ................ | H01H 37/54 337/333 |
| 2013/0127586 | A1 * | 5/2013 | Hofsaess .................. | H01H 1/58 337/365 |
| 2013/0271258 | A1 | 10/2013 | Hofsaess | |
| 2015/0077213 | A1 * | 3/2015 | Le Nguyen ........ | H01H 37/5409 337/333eb |
| 2020/0234898 | A1 | 7/2020 | Namikawa | |
| 2021/0118636 | A1 * | 4/2021 | Hofsaess .............. | H01H 37/323 |

FOREIGN PATENT DOCUMENTS

| | | | |
|---|---|---|---|
| DE | 102007014237 | A1 | 9/2008 |
| DE | 10 2012 103 306 | B3 | 4/2013 |
| DE | 102011119632 | B3 | 4/2013 |
| DE | 10 2013 017 232 | A1 | 4/2015 |
| DE | 102019125453 | | 3/2021 |
| GB | 2049291 | A | 12/1980 |
| JP | S 55148331 | A | 11/1980 |
| JP | 2016507141 | A | 3/2016 |
| WO | WO 2014/124929 | A1 | 8/2014 |

OTHER PUBLICATIONS

EP Search Report for application No. EP 23186032, dated Dec. 20, 2023.

Office Action received in Japanese Application 2023104902 dated May 7, 2024 in 13 pages.

* cited by examiner

TEMPERATURE-DEPENDENT SWITCHING MECHANISM, TEMPERATURE-DEPENDENT SWITCH, AND METHOD OF MANUFACTURING THE SAME

CROSS-REFERENCE TO RELATED APPLICATIONS

This application claims priority from German patent application DE 10 2022 118 402.1, filed on Jul. 22, 2022. The entire content of this priority application is incorporated herein by reference.

BACKGROUND

This disclosure relates to a temperature-dependent switching mechanism for a temperature-dependent switch. The disclosure further relates to a temperature-dependent switch having such a temperature-dependent switching mechanism. Furthermore, the disclosure relates to a method of manufacturing a temperature-dependent switching mechanism that is usable in a temperature-dependent switch.

An exemplary temperature-dependent switch is disclosed in DE 10 2011 119 632 B3.

Such temperature-dependent switches are used in a principally known manner to monitor the temperature of a device. For this purpose, the switch is brought into thermal contact with the device to be protected, e.g. via one of its outer surfaces, so that the temperature of the device to be protected influences the temperature of the switching mechanism arranged inside the switch.

The switch is typically connected electrically in series into the supply circuit of the device to be protected via connecting leads, so that below the response temperature of the switch, the supply current of the device to be protected flows through the switch.

In the switch disclosed in DE 10 2011 119 632 B3, the switching mechanism is arranged inside a switch housing. The switch housing is formed in two parts. It comprises a lower part that is firmly connected to a cover part with an insulating foil interposed therebetween. The temperature-dependent switching mechanism arranged in the switch housing comprises a snap-action spring disc to which a movable contact member is attached, and a bimetal snap-action disc imposed on the movable contact member. The snap-action spring disc presses the movable contact member against a stationary counter contact arranged on the inside of the switch housing on the cover part. The outer edge of the snap-action spring disc is supported in the lower part of the switch housing so that the electrical current flows from the lower part through the snap-action spring disc and the movable contact member into the stationary counter contact and from there into the cover part.

The temperature-dependent bimetal snap-action disc is essentially re-sponsible for the temperature-dependent switching behavior of the switch. This is usually configured as a multilayer, active, sheet-metal component composed of two, three or four interconnected components with different thermal expansion coefficients. In such bimetal snap-action discs, the individual layers of metals or metal alloys are usually joined by material bonding or positive locking, for example by rolling.

Such a bimetal snap-action disc has a first stable geometric configuration (low-temperature configuration) at low temperatures, below the response temperature of the bimetal snap-action disc, and a second stable geometric configuration (high-temperature configuration) at high temperatures, above the response temperature of the bimetal snap-action disc. The bimetal snap-action disc snaps from its low-temperature configuration to its high-temperature configuration in a temperature-dependent manner in the manner of a hysteresis. Thus, if the temperature of the bimetal snap-action disc rises above the response temperature of the bimetal snap-action disc as a result of a temperature increase in the device to be protected, the latter snaps from its low-temperature configuration to its high-temperature configuration. Thereby, the bimetal snap-action disc works against the snap-action spring disc in such a way that it lifts the movable contact member from the stationary counter contact, so that the switch opens and the device to be protected is switched off and cannot heat up any further.

Unless a reset lock is provided, the bimetallic snap-action disc snaps back to its low-temperature configuration so that the switch is closed again as soon as the temperature of the bimetallic snap-action disc drops below the so-called snap-back temperature of the bimetallic snap-action disc as a result of the cooling of the device to be protected.

In its low-temperature configuration, the bimetallic snap-action disc is preferably mounted in the switch housing in a mechanically force-free manner, and the bimetallic snap-action disc is also not used to carry the current. This has the advantage that the bimetal snap-action disc has a longer service life and that the switching point, i.e. the response temperature of the bimetal snap-action disc, does not change even after many switching cycles.

In the case of a large number of temperature-dependent switches, the bimetallic snap-action disc is therefore preferably inserted as a loose individual part in the switch housing during manufacture of the switch, wherein the bimetallic snap-action disc is imposed on the contact member attached to the spring snap-action disc, for example with a central through hole provided therein. Only when the switch housing is closed is the bimetal snap-action disc then fixed in position and its position relative to the other components of the switching mechanism determined. However, the production of such a switch in which the bimetal snap-action disc is inserted individually has proved to be relatively cumbersome, as several steps are required to insert the switching mechanism into the switch housing.

In the switch disclosed in DE 10 2011 119 632 B3, the bimetal snap-action disc is therefore connected in advance (outside the switch housing) to the contact member attached to the snap-action spring disc. For this purpose, the bimetal snap-action disc is imposed on the contact member and then an upper collar of the contact member is folded down. As a result, not only is the snap-action spring disc attached to the contact member, but the bimetal snap-action disc is also held captive on the latter.

The switching mechanism, which is composed of the bimetallic snap-action disc, the spring snap-action disc and the contact member, can thus be manufactured in advance as a semi-finished product that forms a captive unit and can be kept separately in stock as bulk material. When the switch is manufactured, the switching mechanism can then be inserted into the switch housing as a captive unit in a single work step. This simplifies the production of the switch many times over.

In the switch disclosed in DE 10 2011 119 632 B3, the snap-action spring disc is welded or soldered to the contact member in order to establish the best possible electrical contact between the two components. However, it has been shown that, in particular during bulk storage of the switching mechanism prefabricated as a semi-finished product, the welding or soldering device between the contact member and the snap-action spring disc can break. Such defective switching mechanism can then of course no longer be used.

DE 199 19 648 A1 also proposes a temperature-dependent switch whose switching mechanism can be produced in advance as a semi-finished product. In this switching mechanism, too, the bimetal snap-action disc, the snap-action spring disc and the contact member already form a captive unit before installation in the switch housing, which can be inserted into the switch housing as a whole during production of the switch and can be kept in stock in advance as bulk material. In this switching mechanism, the contact member has a sheath of softer metal and a core of electrically conductive, harder metal. The bimetal snap-action disc and snap-action spring disc are fitted to the sheath and molded into the softer metal of the sheath. However, it has been found that this type of connection often leads to unintentional detachment of the bimetal snap-action disc and/or the snap-action spring disc from the contact member during storage of the switching mechanism.

A further possibility of pre-manufacturing the switching mechanism as a semi-finished product is disclosed in DE 29 17 482 A1 and DE 10 2007 014 237 A1. The captive unit of the switching mechanism is achieved by connecting the bimetallic snap-action disc and the spring snap-action disc with each other via a rivet. Depending on the design of the switch, this rivet can also form the movable contact member of the switching mechanism. The rivet is composed of two parts and comprises a rivet bolt cooperating with a hollow rivet or a rivet bolt with a counterholder attached to it.

While this type of riveted connection between the snap-action spring disc and the bimetal snap-action disc has proven to be a mechanically long-term resistant connection, the riveted connection does, however, lead to other disadvantages. For example, the bimetal snap-action disc is usually fixed to the rivet, which can lead to deformation and thus to malfunctions of the bimetal snap-action disc.

SUMMARY

It is an object to provide a temperature-dependent switching mechanism which can be produced simply and inexpensively from as few components as possible as a semi-finished product and can be kept in stock as bulk material without being susceptible to damage which leads to a defect in the switching mechanism. Further, it is an object to provide a method for producing such a temperature-dependent switching mechanism.

According to a first aspect, a temperature-dependent switching mechanism is presented, having:

- a temperature-dependent bimetal snap-action disc comprising a first through hole;
- a temperature-independent snap-action spring disc comprising a second through hole; and
- an electrically conductive contact member comprising a main body that passes through the first through hole and the second through hole;
  - wherein the contact member comprises a support shoulder projecting radially from the main body, a first locking element projecting radially from the main body and arranged on a first side of the support shoulder, and a second locking element projecting radially from the main body and arranged on a second side of the support shoulder opposite the first side,
  - wherein the temperature-dependent bimetal snap-action disc is arranged between the first locking element and the support shoulder and is held captive, but with clearance, on the main body of the contact member by the first locking element and the support shoulder,
  - wherein the temperature-independent snap-action spring disc is arranged between the second locking element and the support shoulder and is held captive, but with clearance, on the main body of the contact member by the second locking element and the support shoulder, and
  - wherein the contact member is integrally formed and the main body is integrally connected to the support shoulder, the first locking element and the second locking element.

According to a second aspect, a temperature-dependent switch is presented, comprising:

- a temperature-dependent switching mechanism; and
- a switch housing surrounding the switching mechanism and comprising a first electrical terminal and a second electrical terminal;
- wherein the temperature-dependent switching mechanism comprises:
- a temperature-dependent bimetal snap-action disc comprising a first through hole;
- a temperature-independent snap-action spring disc comprising a second through hole; and
- an electrically conductive contact member comprising a main body that passes through the first through hole and the second through hole;
- wherein the electrically conductive contact member comprises a support shoulder projecting radially from the main body, a first locking element projecting radially from the main body and being arranged on a first side of the support shoulder, and a second locking element projecting radially from the main body and being arranged on a second side of the support shoulder opposite the first side,
- wherein the temperature-dependent bimetal snap-action disc is arranged between the first locking element and the support shoulder and is held captive, but with clearance, on the main body of the electrically conductive contact member by the first locking element and the support shoulder,
- wherein the temperature-independent snap-action spring disc is arranged between the second locking element and the support shoulder and is held captive, but with clearance, on the main body of the electrically conductive contact member by the second locking element and the support shoulder,
- wherein the electrically conductive contact member is integrally formed and the main body is integrally connected to the support shoulder, the first locking element and the second locking element, and
- wherein the switching mechanism is configured to establish an electrical connection between the first electrical terminal and the second electrical terminal below a response temperature of the bimetal snap-action disc and to interrupt the electrical connection upon exceeding the response temperature.

According to a third aspect, a method for manufacturing a temperature-dependent switching mechanism is presented, comprising the following steps:

- providing a temperature-dependent bimetal snap-action disc comprising a first through hole;
- providing a temperature-independent snap-action spring disc comprising a second through hole;

- providing an electrically conductive contact member comprising a main body and a support shoulder projecting radially from the main body;
- passing the main body through the first through hole so that the bimetal snap-action disc is arranged on a first side of the support shoulder;
- passing the main body through the second through hole so that the snap-action spring disc is arranged on a second side of the support shoulder opposite the first side;
- forming a first portion of the main body arranged on the first side of the support shoulder to create a first locking element such that the temperature-dependent bimetal snap-action disc is arranged between the first locking element and the support shoulder and is held captive, but with clearance, to the main body of the contact member by the first locking element and the support shoulder; and
- forming a second portion of the main body arranged on the second side of the support shoulder to create a second locking element such that the temperature-independent snap-action spring disc is arranged between the second locking element and the support shoulder and is held captive, but with clearance, to the main body of the contact member by the second locking element and the support shoulder.

The presented switching mechanism comprises an electrically conductive contact member that is passed through through-holes which are respectively in the bimetal snap-action disc and the snap-action spring disc. The contact member thus projects through both snap-action discs. It has a radially projecting support shoulder against which the two snap-action discs rest from opposite sides. Locking elements arranged on both sides of this support shoulder hold the respective snap-action disc between the support shoulder and the respective locking element captive but with clearance on the contact member. The contact member, together with the bimetal snap-action disc and the snap-action spring disc, thus forms a captive unit which can be prefabricated as a semi-finished product and kept in stock as bulk material and can then be inserted as a unit in its entirety into a corresponding switch housing when the switch is assembled.

The locking elements for holding and locking the bimetal snap-action disc and the snap-action spring disc are integrally connected to the main body of the contact member. The locking elements are created by forming a respective part of the main body. The contact member is thus formed in one piece and the main body of the contact member is integrally connected to the support shoulder and the two locking elements.

All in all, the contact member, the bimetal snap-action disc and the snap-action spring disc can be combined to form a three-part switching mechanism that is implemented as a captive unit. This three-part design has both the advantage of having as few necessary components as possible and the advantage of a mechanically very stable and resistant design of the switching mechanism.

Unlike the switch disclosed in DE 10 2011 119 632 B3, there can be no destruction of the welded or soldered connection between the snap-action spring disc and the contact member, since there is no such connection.

Unintentional detachment of the bimetal snap-action disc and/or the snap-action spring disc from the contact member, as described with regard to DE 199 19 648 A1, is also hardly possible due to the locking elements.

The integral design of the contact member is advantageous both for mechanical reasons and in terms of the lower manufacturing costs thereof compared with the two-piece design of the riveted connections, as implemented in the switches disclosed in DE 10 2007 014 237 A1 and DE 29 17 482 A1. In addition, the bimetal snap-action disc and the snap-action spring disc are held with clearance on the main body of the contact member by means of the locking elements, so that there is hardly any possibility of undesirable stresses and resulting deformations of the two snap discs.

According to a refinement, the first locking element comprises at least one first retaining claw projecting radially from the main body and formed integrally therewith, or a first flanged collar projecting radially from the main body and surrounding the circumference of the main body. Likewise, according to this refinement, the second locking element comprises at least one second retaining claw projecting radially from the main body and formed integrally therewith, or a second flanged collar projecting radially from the main body and surrounding the circumference of the main body.

One or more retaining claws can be provided for each locking element (first and second locking element). The retaining claws can form individual circumferential sections of the main body or surround the entire circumference of the main body. These retaining claws can be configured as bent or flanged retaining claws.

Instead of retaining claws, a circumferential collar can also act as a locking element in each case. This collar can be produced by flanging a part correspondingly preformed on the main body of the contact member. Alternatively, the collar can also be produced by a circumferential cut notch made in the main body, through which the material of the main body lying radially further outward is bent radially outwards and forms the collar.

In this way, the two snap-action discs are held captive but with clearance on the main body. The manufacture of these locking elements is extremely simple. Because they are integrally connected to the main body, the locking elements are configured to be mechanically very stable.

According to a further refinement, a first distance between an upper side of the contact member arranged on the first side of the support shoulder and a lower side of the contact member arranged on the second side of the support shoulder is larger than a second distance between the first locking element and the second locking element.

In other words, the locking elements are arranged in an area between the free upper side and the free lower side of the contact member. Accordingly, the contact member can rest with its free upper side and its free lower side against corresponding counter contacts or counter contact surfaces without the locking elements coming into contact with the counter contacts or the counter contact surfaces. On the one hand, this creates a precisely defined contact between the contact member and the counter contacts or counter contact surfaces and, on the other hand, prevents damage to the locking elements.

According to a further refinement, the bimetal snap-action disc is held on the main body with larger clearance than the snap-action spring disc.

The snap-action spring disc is therefore preferably more tightly clamped between the support shoulder and the second locking element than the bimetal snap-action disc is between the support shoulder and the first locking element. The bimetal snap-action disc thus has greater mobility relative to the contact member than the snap-action spring disc. On the one hand, this guarantees the best possible electrical contact between the snap-action spring disc and the contact member and, on the other hand, allows sufficient mobility of the bimetal snap-action disc, which is advantageous in terms of its service life.

Since the bimetal snap-action disc, unlike the snap-action spring disc, is preferably not used as a current-carrying component of the switching mechanism, there does not need to be any clamping of too tight dimensions between the bimetal snap-action disc and the contact member.

According to a further refinement, the switching mechanism is configured rotationally symmetrical about a longitudinal axis of the contact member.

This makes it very easy to insert the switching mechanism into a switch housing. In addition, this allows an optimal force transmission from the two snap-action discs to the contact member, which force transmission is equally distributed in the circumferential direction.

According to a further refinement, the first through hole is arranged centrally in the bimetal snap-action disc. Likewise, the second through-hole is preferably arranged centrally in the snap-action spring disc.

The bimetal snap-action disc and the snap-action spring disc are preferably each circular disc-shaped. Furthermore, the bimetal snap-action disc and the snap-action spring disc are preferably each bistable.

"Bistable" in this respect means that both snap-action discs each comprise two different, stable geometric configurations/positions (used synonymously here), wherein the two stable configurations/positions of the bimetal snap-action disc is temperature-dependent and the two stable configurations/positions of the snap-action spring disc is temperature-independent. This has the effect that the two snap-action discs remain stable in their respective positions after they have snapped over from one position to the other, without any undesired snapping back. Thus, the switching mechanism only snaps over when the response temperature of the bimetal snap-action disc is exceeded and when the reset temperature of the bimetal snap-action disc is undershot. The spring snap-action disc snaps together with the bimetal snap-action disc and forces it into its respective other configuration/position.

According to a further refinement, the switching mechanism further comprises a switching mechanism housing that captively, but with clearance, holds the bimetal snap-action disc, the snap-action spring disc, and the contact member.

This switching mechanism housing is not to be confused with the typical switch housing, which forms the outer housing of the switch. The switching mechanism housing used according to this refinement is an additional housing in which the switching mechanism can already be arranged before its installation in the outer switch housing.

In this way, the switching mechanism can already be prefabricated as a semi-finished product in the switching mechanism housing and then be inserted into the switch housing together with the switching mechanism housing.

On the one hand, the switching mechanism housing has the advantage that the fragile components of the switching mechanism, such as the bimetallic snap-action disc and the snap-action spring disc, are protected by the switching mechanism housing during storage. On the other hand, the additional switching mechanism housing enables a substantially simplified installation of the switching mechanism in the switch housing, since the switching mechanism housing already enables a pre-positioning of the switching mechanism. Furthermore, the additional switching mechanism housing allows an extremely pressure-stable switch to be realized.

The switching mechanism housing preferably at least partially surrounds the bimetal snap-action disc and the snap-action spring disc from a first housing side, a second housing side opposite the first housing side, and a housing circumferential side extending between and transverse to the first and second housing sides, the first housing side having an opening through which the contact member is accessible from outside the switching mechanism housing.

The stationary contact acting as a counterpart to the contact member can thus still be arranged on the switch (outer) housing, since the contact member protrudes from the switch housing via the aforementioned opening. Thus, a first electrical contact can take place between the contact member and the counter contact arranged on the switch housing. The second electrical contact between the switching mechanism and the second stationary contact, which is also arranged on the switch housing, can be made via the switching mechanism housing.

A diameter of the opening in the switching mechanism housing is preferably smaller than a diameter of the bimetal snap-action disc measured parallel thereto.

The bimetal snap-action disc is thus securely held in the switching mechanism housing and cannot detach from it even in the event of corresponding vibration.

The switching mechanism housing is preferably formed integrally and comprises an electrically conductive material. Particularly preferably, the switching mechanism housing is formed of metal.

The switching mechanism housing is preferably used in the switch as a current-carrying component. The snap-action spring disc is preferably supported on the inside of the switching mechanism housing so that the current flows from one terminal of the switch via the switching mechanism housing, the snap-action spring disc and the contact member to the other terminal of the switch in the installed state of the switch and the closed switch position.

As mentioned above, the present disclosure relates not only to the switching mechanism itself, but also to the temperature-dependent switch in which such a temperature-dependent switching mechanism is used. The temperature-dependent switch comprises a switch (outer) housing surrounding the switching mechanism and having a first electrical terminal and a second electrical terminal, wherein the switching mechanism is adapted to establish an electrical connection between the first and second electrical terminals below a response temperature of the bimetal snap-action disc and to break the electrical connection when the response temperature is exceeded.

It is to be understood that the above features and those yet to be explained below can be used not only in the combination indicated in each case, but also in other combinations or on their own, without departing from the spirit and scope of the present disclosure.

DETAILED DESCRIPTION OF PREFERRED EMBODIMENTS

Figure 1:
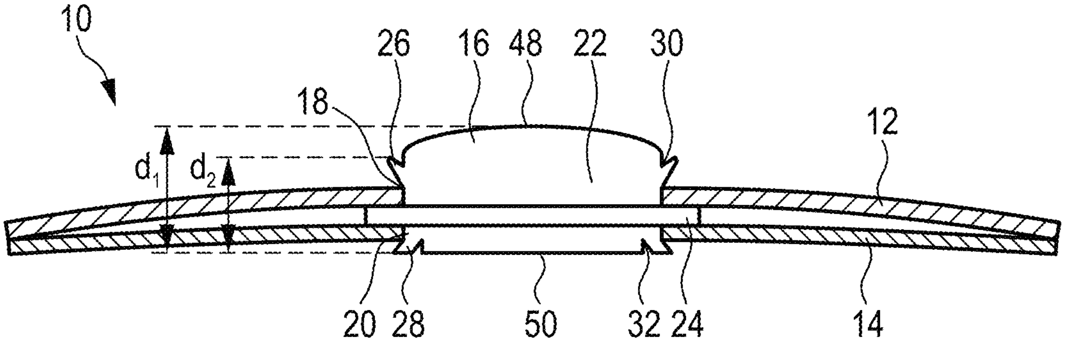
FIG. 1 a schematic sectional view of the temperature-dependent switching mechanism according to a first embodiment.

FIGS. 1-4 show various embodiments of the switching mechanism, each in a schematic sectional view. In each case, the switching mechanism is designated in its entirety with the reference numeral 10.

The switching mechanism 10 is a temperature-dependent switching mechanism. As explained in more detail below, the switching mechanism 10 switches between a low-temperature position and a high-temperature position depending on the temperature. In FIGS. 1-4, the low-temperature position of the switching mechanism 10 is shown in each case.

The switch unit 10 has a three-part design. It comprises a temperature-dependent bimetal snap-action disc 12, a temperature-independent snap-action spring disc 14 and a contact member 16. The bimetallic snap-action disc 12 and the snap-action spring disc 14 are held captive on the contact member, but with clearance. The switching mechanism 10 can thus be prefabricated as a semi-finished product and then installed as a complete unit in a corresponding switch, such as that shown in FIGS. 5 and 6. Since the two snap-action discs 12, 14 are held captive on the contact member 16, an unintentional detachment of the two snap-action discs 12, 14 from the contact member 16 is prevented.

The two snap-action discs 12, 14 are preferably circular disc-shaped, wherein each comprises a centrally arranged through hole 18, 20. The through hole 18 arranged centrally in the bimetal snap-action disc 12 is referred to as the first through hole. The through hole 20 arranged in the snap-action spring disc 14 is referred to as the second through hole.

The two snap-action discs 12, 14 are imposed on the contact member 16 from opposite sides with their respective through hole 18, 20. Thus, the contact member 16 penetrates both snap-action discs 12, 14 at a central point. The contact member 16 comprises a main body 22, which is preferably solid and comprises an electrically conductive material. This main body 22 passes through the two through holes 18, 20.

Approximately in the middle, i.e. at about half the height, the contact member 16 comprise a support shoulder 24 projecting radially from the main body 22. The two snap-action discs 12, 14 rest against this support shoulder 24 from opposite sides. The bimetal snap-action disc 12 is arranged on a first side of the support shoulder 24, which forms the upper side in FIGS. 1-4. The snap-action spring disc 14 is arranged on a second side of the support shoulder 24 opposite the first side, which forms the lower side in FIG. 1-4.

Furthermore, locking elements 26, 28 are formed on the contact member 16, by means of which the two snap discs 12, 14 are held on the contact member 16. The two locking elements 26, 28 project radially from the main body 22 of the contact member 16. The first locking element 26 is arranged on the first side of the support shoulder 24. The second locking element 28 is arranged on the opposite second side of the support shoulder 24.

The bimetal snap-action disc 12 is arranged between the first locking element 26 and the support shoulder 24, and is held captive but with clearance on the main body 22 of the contact member 16 between the first locking element 26 and the support shoulder 24 due to the radial projection of the first locking element 26 and the support shoulder 24.

The snap-action spring disc 14 is arranged between the second locking element 28 and the support shoulder 24, and is held captive but with clearance on the main body 22 of the contact member 16 between the second locking element 28 and the support shoulder 24 due to the radial projection of the second locking element 28 and the support shoulder 24.

The contact member 16 is formed in one piece together with the support shoulder 24 and the two locking elements 26, 28. In other words, the support shoulder 24 and the two locking elements 26, 28 are formed integrally with the main body 22 of the contact member 16.

In the first embodiment shown in FIG. 1, the two locking elements 26, 28 are each configured as a circumferential collar formed by a circumferential cut notch 30 and 32, respectively. The circumferential collar forming the first locking element 26 projects radially upwardly at an angle from the main body 22 of the contact member 16. The collar forming the second locking element 28 projects obliquely downward radially from the main body 22 of the contact member 16.

Both collars can be formed into the contact member 16 relatively easily by forming a circumferential cut notch 30 or 32. The cut notches 30, 32 are formed into the contact member 16 after the two snap-action discs 12, 14 have been slipped over the main body 22 of the contact member 16 with their through holes 18, 20.

Figure 2:
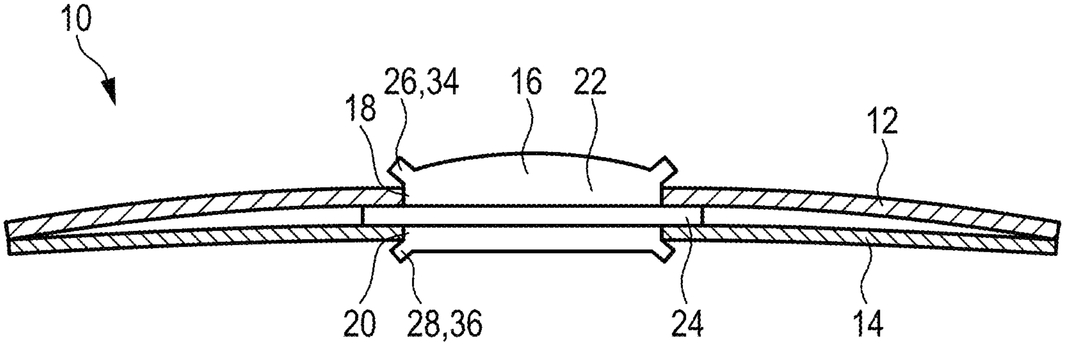
FIG. 2 a schematic sectional view of the temperature-dependent switching mechanism according to a second embodiment.

In the second embodiment shown in FIG. 2, the locking elements 26, 28 each comprise at least one retaining claw 34 or 36. Both locking elements 26, 28 can have either a radially circumferential retaining claw 34, 36 extending over the entire circumference of the contact member. Such circumferential retaining claws then form very similar locking elements to the collars shown in FIG. 1.

Alternatively, it is possible for both locking elements 26, 28 to each comprise a plurality of such retaining claws 34, 36, which are circumferentially spaced from one another on the contact member 16. Intermediate spaces then exist between these individual, circumferentially distributed retaining claws.

Regardless of whether the two retaining claws 34, 36 each extend continuously over the entire circumference of the contact member or have several claw elements distributed over the circumference, the retaining claws 34, 36 are preferably manufactured by forming or beading correspondingly preformed claw elements. Part of this manufacturing process is shown schematically in FIG. 7.

Figure 7:
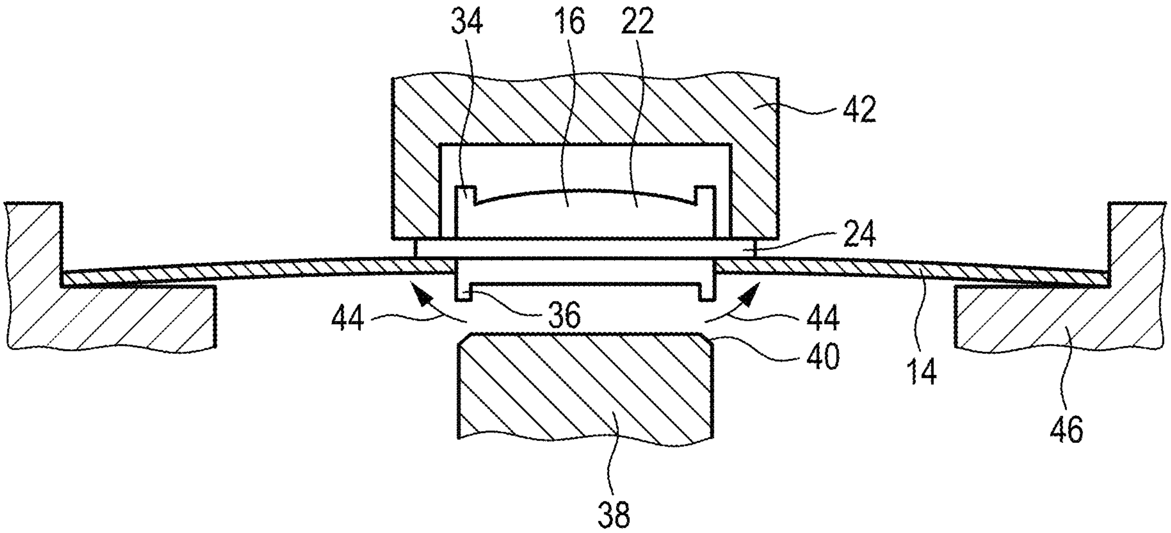
FIG. 7 a schematic illustration for explaining a manufacturing step in the production of the switching mechanism in accordance with the second embodiment shown in FIG. 2.

FIG. 7 shows in particular the flanging of the lower retaining claw 36, which later forms the second locking element 28, which serves to fasten the snap-action spring disc 14 to the contact member 16. In the initial state, the preformed retaining claws 34, 36 protrude upward and downward, respectively, from the main body 22 in the axial direction. They are flanged by a suitable press plunger 38. This press plunger 38 has at its radially outer end a circumferentially arranged bevel 40, with which the press plunger 38 contacts the retaining claw 36 during the forming process. A counter-holder 42 acting as a counterpart to the press plunger 38 presses from the opposite side onto the support shoulder 24 of the contact member 16. The retaining claw 36 is thus bent or flanged by the press plunger 38. This is indicated in FIG. 7 by the arrows 44. During this process, the snap-action spring disc 14 preferably rests on a radially circumferential bearing surface 46.

The bimetal snap-action disc 12 is mounted and fixed in the same way. For this purpose, the contact member 16 together with the snap-action spring disc 14 attached to it is turned through 180° about an axis aligned orthogonally to the sheet plane and the bimetal snap-action disc is slipped over the main body 22 of the contact member 16 so that it is arranged on the opposite side of the support shoulder 24 compared to the snap-action spring disc 14. The retaining claw 34 can then be bent radially outwardly by means of the same press plunger 38, so that it too is ultimately secured to the contact member 16.

The main body 22 of the contact member 16 is preferably convexly shaped at its upper side 48. The contact member 16 is preferably configured such that a distance $d_1$ between the upper side 48 and the lower side 50 of the contact member 16 is larger than a distance $d_2$ between the first locking element 26 and the second locking element 28.

Preferably, at least the upper side 48 of the contact member 16 protrudes upwards with respect to the first locking element 26. This is particularly advantageous because the upper side 48 of the contact member 16 comes into contact with a corresponding counter contact and the locking elements 26, 28 do not cause a collision with the counter contact.

Furthermore, it is advantageous for the function of the switching mechanism 10 if the bimetal snap-action disc 12 is held on the contact member 16 with larger clearance than the snap-action spring disc 14. This guarantees sufficiently free movement of the bimetal snap-action disc 12. At the same time, the slightly smaller clearance between the snap-action spring disc 14 and the contact member 16 guarantees the best possible electrical contact between these two components.

Figure 3:
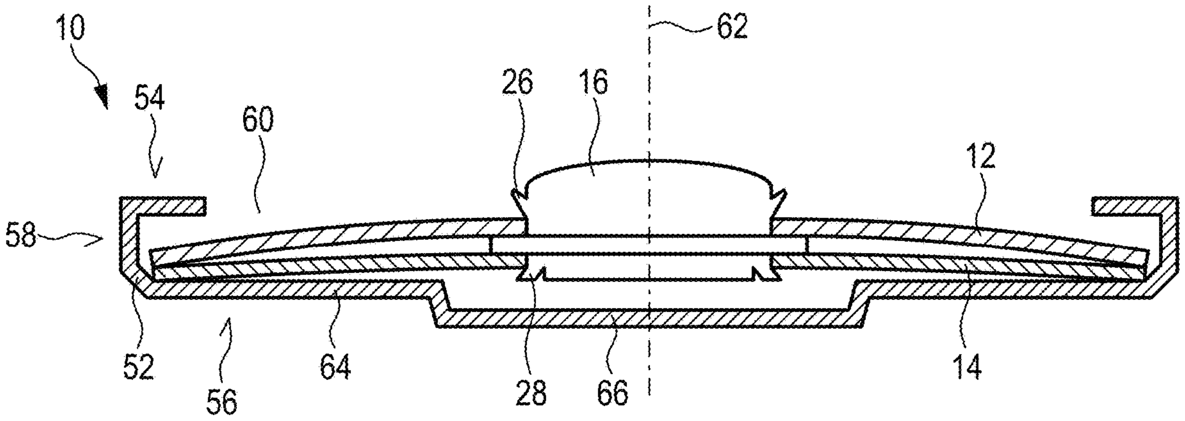
FIG. 3 a schematic sectional view of the temperature-dependent switching mechanism according to a third embodiment.
Figure 4:
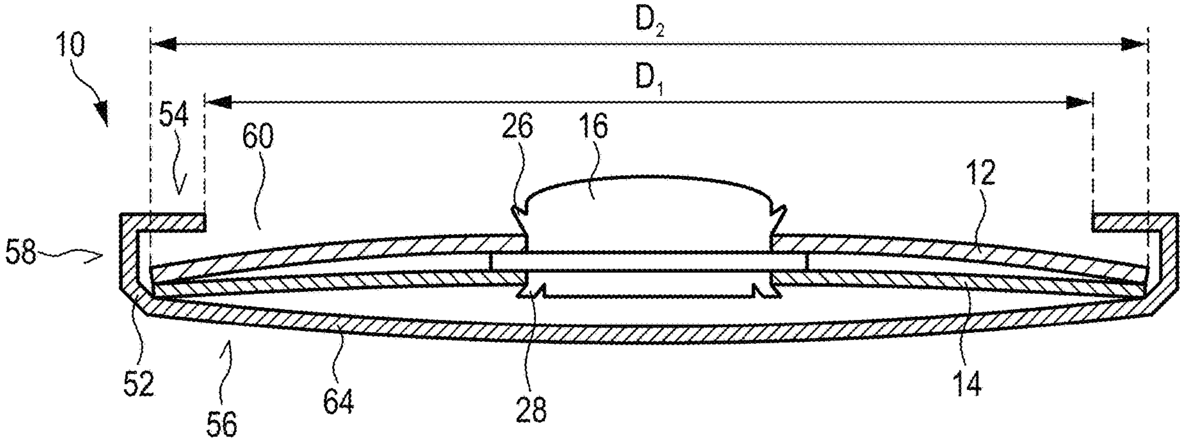
FIG. 4 a schematic sectional view of the temperature-dependent switching mechanism according to a fourth embodiment.

FIGS. 3 and 4 show further embodiments of the switching mechanism 10. The configuration of the bimetallic snap-action disc 12, the snap-action spring disc 14 and the contact member 16 is identical to the embodiment shown in FIG. 1. In addition thereto, the switching mechanism 10 according to the embodiments shown in FIGS. 3 and 4 comprises a switching mechanism housing 52. In this switching mechanism housing 52, the unit consisting of the bimetal snap-action disc 12, the spring snap-action disc 14 and the contact member 16 is held captive but with clearance.

The switching mechanism housing 52 surrounds the bimetal snap-action disc 12 and the snap-action spring disc 14 at least partially from a first housing side 54, a second housing side 56 opposite the first housing side 54, and a housing peripheral side 58 extending between and transverse to the first and second housing sides 54, 56. An opening is provided in the switching mechanism housing 52 on the first housing side 54, through which the contact member 16 is accessible from outside the switching mechanism housing 52.

A diameter $D_1$ of the opening 60 is smaller than a diameter $D_2$ of the bimetal snap-action disc 12 measured parallel thereto. Thus, although the contact member 16 is accessible from the outside through the opening 60, the bimetal snap-action disc 12 cannot detach from the switching mechanism housing 52.

The switching mechanism housing 52 is preferably formed in one piece and consists of an electrically conductive material, for example metal. The switching mechanism 10 is preferably rotationally symmetrical about a longitudinal axis 62 of the contact member 16, both including and excluding the switching mechanism housing 52.

The two embodiments of the switching mechanism 10 shown in FIGS. 3 and 4 differ essentially in the shape of the switching mechanism housing 52. While the bottom 64 arranged on the second housing side 56 in the embodiment shown in FIG. 4 has in section an arcuate configuration and forms a kind of convex dome, the bottom 64 in the embodiment shown in FIG. 3 has an essentially plate-like configuration and has a cup-like bulge 66 in a central section.

Of course, other shapes of the switching mechanism housing 52 are possible. However, it is important that the contact member 16 can move downward within the switching mechanism housing 52 when the snap-action discs 12, 14 snap over from the position shown in FIGS. 3 and 4. The reason for this can be seen, in particular, from the following explanations of the function of the temperature-dependent switch shown in FIGS. 5 and 6.

Figure 5:
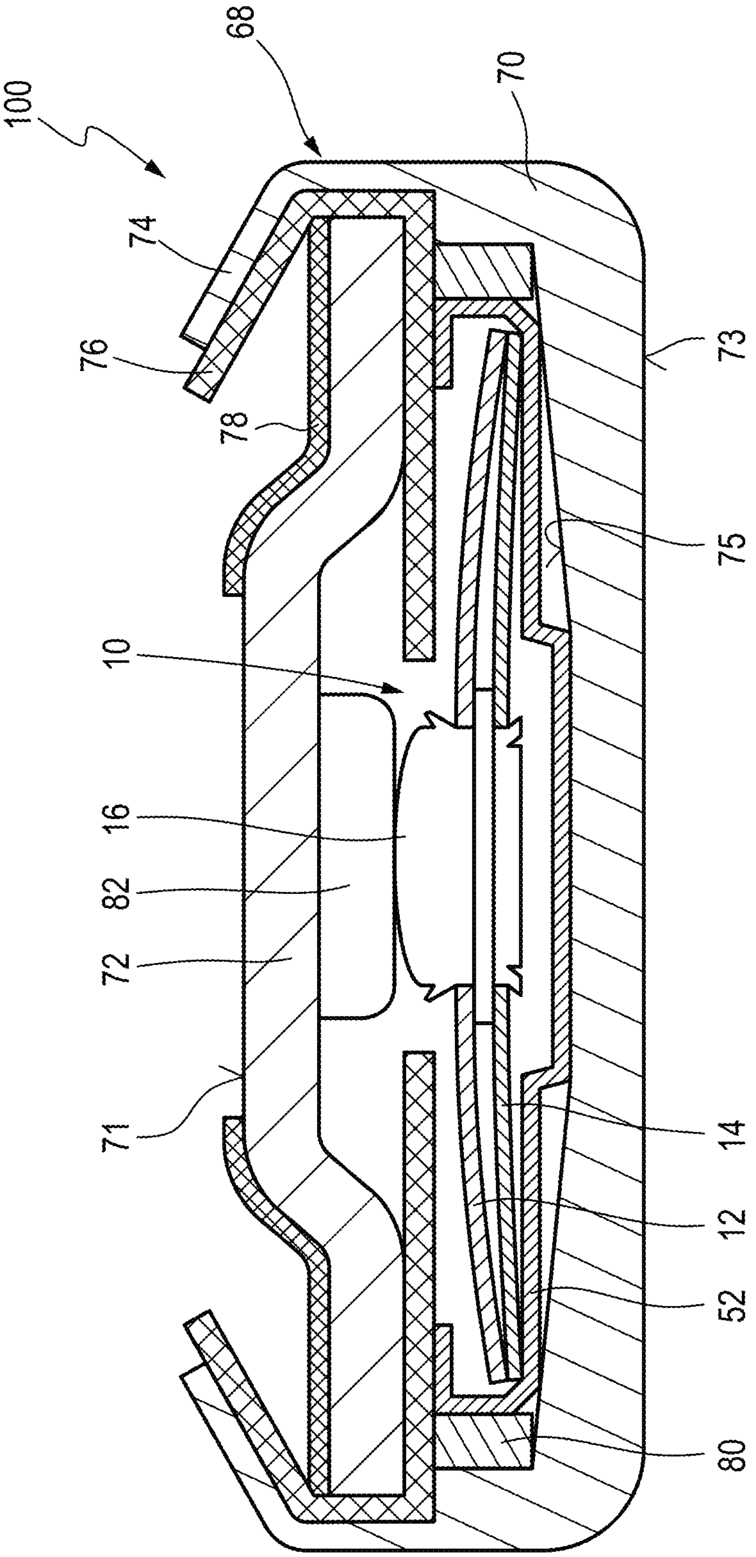
FIG. 5 a schematic sectional view of an embodiment of the temperature-dependent switch in its low-temperature position.
Figure 6:
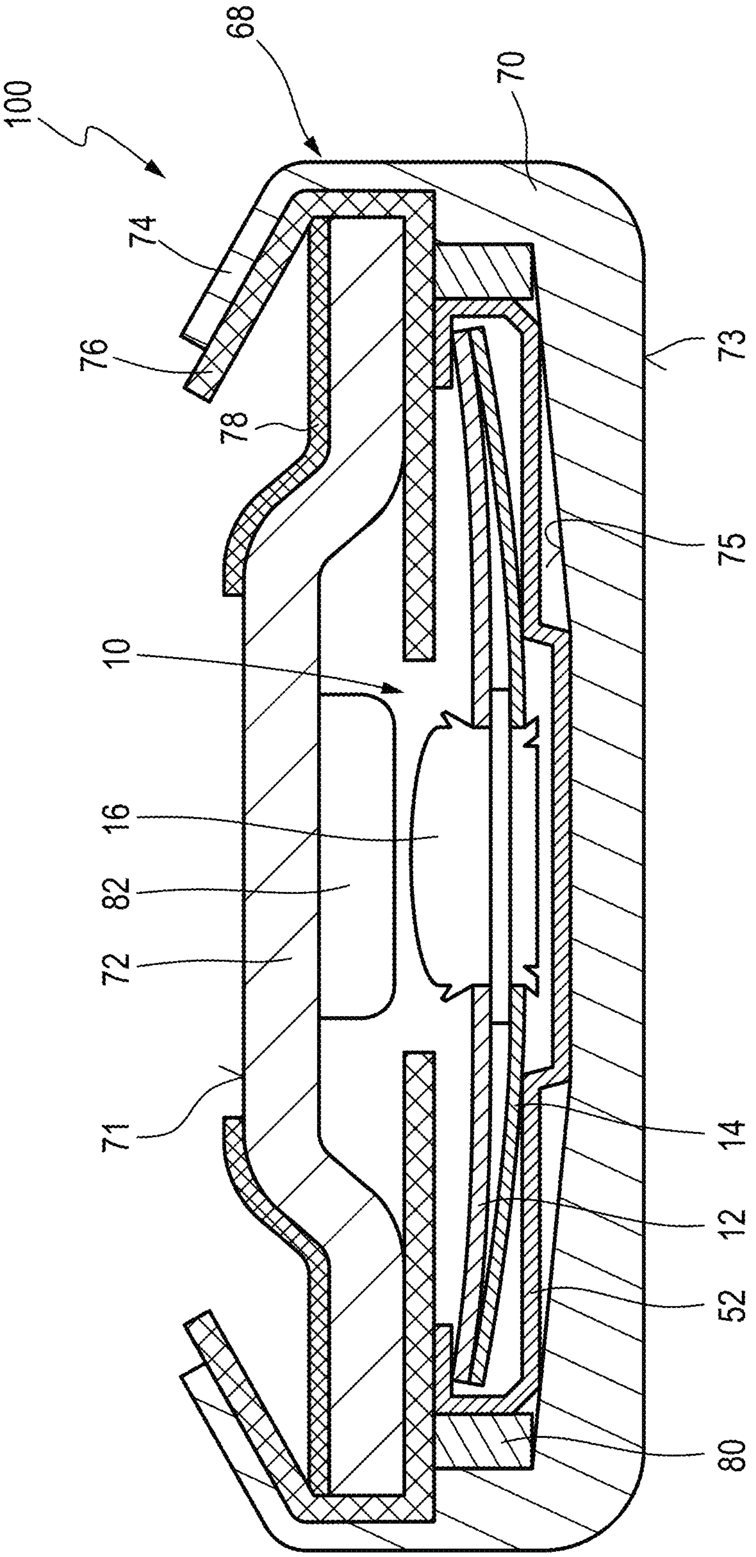
FIG. 6 a schematic sectional view of the embodiment of the temperature-dependent switch shown in FIG. 5 in its high-temperature position.

In FIGS. 5 and 6, an embodiment of a temperature-dependent switch in which the switching mechanism 10 can be used is shown in each case in a schematic sectional view. The switch is denoted therein in its entirety with the reference numeral 100.

FIG. 5 shows the low temperature position of switch 100. FIG. 6 shows the high temperature position of switch 100.

According to the embodiment shown in FIGS. 5 and 6, the switch 100 comprises a switch housing 68 which functions as an outer housing for the switching mechanism 10. The switching mechanism 10 is inserted into the switch housing 68 together with its switching mechanism housing 52. The switching mechanism 10 corresponds to the embodiment shown in FIG. 3. However, it is understood that the switching mechanism shown in FIG. 4 can also be inserted into the switch housing 68 of the switch 100 in an equivalent form. Likewise, a switching mechanism 10 without a switching mechanism housing 52, as shown in FIGS. 1 and 2, for example, can also be inserted into the switch housing 68 of the switch 100 without changing the basic function of the switch 100.

The switch housing 68 includes a pot-like lower part 70 and a lid part 72 held to the lower part 70 by a folded or flanged edge 74.

In the embodiment shown in FIGS. 5 and 6, both the lower part 70 and the lid part 72 are formed from an electrically conductive material, preferably metal. An insulating foil 76 is arranged between the lower part 70 and the lid part 72. The insulating foil 76 provides electrical insulation of the lower part 70 with respect to the lid part 72. Likewise, the insulating foil 76 provides a mechanical seal that prevents liquids or contaminants from entering the interior of the housing from the outside.

Since the lower part 70 and the lid part 72 in this embodiment are each made of electrically conductive material, thermal contact to an electrical device to be protected can be established via their outer surfaces. The outer surfaces also serve as the external electrical connection of the switch 100. For example, the outer surface 71 of the lid part 72 may serve as the first electrical terminal and the outer surface 73 of the lower part 70 may serve as the second electrical terminal.

A further insulation layer 78 may be arranged on the outside of the lid part 72, as shown in FIGS. 5 and 6.

The switching mechanism 10 is arranged clamped between the lower part and the lid part 72. A spacer ring 80, against which the switching mechanism housing 52 rests circumferentially, is used to position the switching mechanism 10. It is particularly important that the contact member

16 is aligned with respect to a counter contact 82, which is arranged on the inside of the cover part 72. This counter contact 82 is also referred to herein as the first stationary contact. The inner side 75 of the lower part 70 serves as the second stationary contact.

In the position shown in FIG. 5, the switch 100 is in its low-temperature position, in which the temperature-independent snap-action spring disc 14 is in its first configuration and the temperature-dependent bimetal snap-action disc 12 is in its low-temperature configuration. The snap-action spring disc 14 thereby presses the contact member 16 against the counter contact 82, and the switch 100 is thus in its closed position in which an electrically conductive connection is established between the first stationary contact 82 and the second stationary contact 75 via the contact member 16 and the snap-action spring disc 14. Contact pressure between the contact member 16 and the first stationary contact 82 is provided by the snap-action spring disc 14. In contrast, the bimetal snap-action disc 12 is virtually force-free in this state.

If the temperature of the device to be protected and thus the temperature of the switch 100, as well as the bimetal snap-action disc 12 arranged therein, now increases to the switching temperature of the bimetal snap-action disc 12, or above this switching temperature, the latter snaps over from its convex low-temperature configuration shown in FIG. 5 to its concave high-temperature configuration shown in FIG. 6. During this snapping over, the outer edge of the bimetal snap-action disc 12 bears against the first housing side 54 of the switch housing 52. With its center, the bimetal snap-action disc 12 pulls the movable contact member 16 downward and lifts the movable contact member 16 away from the first stationary contact 82. This simultaneously causes the snap-action spring disc 14 to flex downward at its center, causing the snap-action spring disc 14 to snap over from its first stable geometric configuration shown in FIG. 5 to its second stable geometric configuration shown in FIG. 6. FIG. 6 shows the high-temperature position of switch 100, in which it is open. The circuit is thus interrupted.

Unless the switching mechanism 10 includes a switching mechanism housing 52, in the high temperature position of the switching mechanism 100, the bimetal snap-action disc 12 supports against the lid part 72 with the insulating foil 76 interposed.

When the device to be protected and thus the switch 100 including the bimetal snap-action disc 12 then cool down again, the bimetal snap-action disc 12 snaps back into its low-temperature position when the reset temperature is reached, which is also referred to as the snap-back temperature, as shown in FIG. 5, for example. Thus, a reversible switching behavior can be realized.

Of course, it is also possible for a switch once it has been snapped over to the high-temperature position to be prevented from switching back by means of a corresponding locking mechanism. A large number of such locking mechanisms, which are used in particular for one-time switches where switchback is to be prevented, are already known from the prior art.

Finally, it should be noted that the switching mechanism 10, as shown for example in FIGS. 1-4 in various embodiments, can also be used in other types of switches of temperature-dependent switches. FIGS. 5 and 6 show only one possible design of a temperature-dependent switch in which the switching mechanism 10 can be used.

What is claimed is:

1. A temperature-dependent switching mechanism for a temperature-dependent switch, having:

a temperature-dependent bimetal snap-action disc comprising a first through hole;

a temperature-independent snap-action spring disc comprising a second through hole; and an electrically conductive contact member comprising a main body that passes through the first through hole and the second through hole;

wherein the electrically conductive contact member comprises a support shoulder projecting radially from the main body, a first locking element projecting radially from the main body and being arranged on a first side of the support shoulder, and a second locking element projecting radially from the main body and being arranged on a second side of the support shoulder opposite the first side, wherein the temperature-dependent bimetal snap-action disc is arranged between the first locking element and the support shoulder and is held captive, but with clearance, on the main body of the electrically conductive contact member by the first locking element and the support shoulder, wherein the temperature-independent snap-action spring disc is arranged between the second locking element and the support shoulder and is held captive, but with clearance, on the main body of the electrically conductive contact member by the second locking element and the support shoulder, and wherein the electrically conductive contact member is integrally formed and the main body is integrally connected to the support shoulder, the first locking element and the second locking element.

2. The temperature-dependent switching mechanism according to claim 1, wherein the first locking element comprises at least one first retaining claw projecting radially from the main body, or a first collar projecting radially from the main body and surrounding a circumference of the main body, and wherein the second locking element comprises at least one second retaining claw projecting radially from the main body, or a second collar projecting radially from the main body and surrounding the circumference of the main body.

3. The temperature-dependent switching mechanism according to claim 1, wherein a first distance between an upper side of the electrically conductive contact member arranged on the first side of the support shoulder and a lower side of the electrically conductive contact member arranged on the second side of the support shoulder is larger than a second distance between the first locking element and the second locking element.

4. The temperature-dependent switching mechanism according to claim 1, wherein the temperature-dependent bimetal snap-action disc is held on the main body with a larger clearance than that of the temperature-independent snap-action spring disc.

5. The temperature-dependent switching mechanism according to claim 1, wherein the temperature-dependent switching mechanism is rotationally symmetrical about a longitudinal axis of the electrically conductive contact member.

6. The temperature-dependent switching mechanism according to claim 1, wherein the first through hole is arranged centrally in the temperature-dependent bimetal snap-action disc, and wherein the second through hole is arranged centrally in the temperature-independent snap-action spring disc.

7. The temperature-dependent switching mechanism according to claim 1, wherein the temperature-dependent bimetal snap-action disc and the temperature-independent snap-action spring disc are each circular disc-shaped.

8. The temperature-dependent switching mechanism according to claim 1, wherein the temperature-independent snap-action spring disc is bistable having two temperature-independent stable geometric configurations, and wherein the temperature-dependent bimetal snap-action disc is bistable having two temperature-dependent stable geometric configurations.

9. The temperature-dependent switching mechanism according to claim 1, having a switching mechanism housing which holds the temperature-dependent bimetal snap-action disc, the temperature-independent snap-action spring disc and the electrically conductive contact member captive, but with clearance.

10. The temperature-dependent switching mechanism according to claim 9, wherein the switching mechanism housing surrounds the temperature-dependent bimetal snap-action disc and the temperature-independent snap-action spring disc from a first housing side, a second housing side opposite the first housing side, and a housing peripheral side extending between and transverse to the first and second housing sides, the first housing side having an opening through which the electrically conductive contact member is accessible from outside the switching mechanism housing.

11. The temperature-dependent switching mechanism according to claim 10, wherein a diameter of the opening is smaller than a diameter of the temperature-dependent bimetal snap-action disc measured parallel thereto.

12. The temperature-dependent switching mechanism according to claim 9, wherein the switching mechanism housing is integrally formed and comprises an electrically conductive material.

13. A temperature-dependent switch comprising:

a temperature-dependent switching mechanism; and a switch housing surrounding the temperature-dependent switching mechanism and comprising a first electrical terminal and a second electrical terminal;

wherein the temperature-dependent switching mechanism comprises:

a temperature-dependent bimetal snap-action disc comprising a first through hole;

a temperature-independent snap-action spring disc comprising a second through hole; and an electrically conductive contact member comprising a main body that passes through the first through hole and the second through hole;

wherein the electrically conductive contact member comprises a support shoulder projecting radially from the main body, a first locking element projecting radially from the main body and being arranged on a first side of the support shoulder, and a second locking element projecting radially from the main body and being arranged on a second side of the support shoulder opposite the first side, wherein the temperature-dependent bimetal snap-action disc is arranged between the first locking element and the support shoulder and is held captive, but with clearance, on the main body of the electrically conductive contact member by the first locking element and the support shoulder, wherein the temperature-independent snap-action spring disc is arranged between the second locking element and the support shoulder and is held captive, but with clearance, on the main body of the electrically conductive contact member by the second locking element and the support shoulder, wherein the electrically conductive contact member is integrally formed and the main body is integrally connected to the support shoulder, the first locking element and the second locking element, and wherein the temperature-dependent switching mechanism is configured to establish an electrical connection between the first electrical terminal and the second electrical terminal below a response temperature of the temperature-dependent bimetal snap-action disc and to interrupt the electrical connection upon exceeding the response temperature.

14. A method of manufacturing a temperature-dependent switching mechanism comprising:

providing a temperature-dependent bimetal snap-action disc comprising a first through hole;

providing a temperature-independent snap-action spring disc comprising a second through hole;

providing an electrically conductive contact member comprising a main body and a support shoulder projecting radially from the main body;

passing the main body through the first through hole so that the temperature-dependent bimetal snap-action disc is arranged on a first side of the support shoulder;

passing the main body through the second through hole so that the temperature-independent snap-action spring disc is arranged on a second side of the support shoulder opposite the first side;

forming a first portion of the main body arranged on the first side of the support shoulder to create a first locking element such that the temperature-dependent bimetal snap-action disc is arranged between the first locking element and the support shoulder and is held captive, but with clearance, to the main body of the electrically conductive contact member by the first locking element and the support shoulder; and forming a second portion of the main body arranged on the second side of the support shoulder to create a second locking element such that the temperature-independent snap-action spring disc is arranged between the second locking element and the support shoulder and is held captive, but with clearance, to the main body of the electrically conductive contact member by the second locking element and the support shoulder.

* * * * *